United States Patent Office 2,816,910
Patented Dec. 17, 1957

---

2,816,910

ESTERS OF CARBAMIC ACID AND A METHOD OF MAKING SAME

Karl Junkmann, Berlin, and Heinrich Pfeiffer, Berlin-Hermsdorf, Germany, assignors to Schering A. G., Berlin, Germany, a corporation of Germany No Drawing. Application April 1, 1953,
Serial No. 346,248

Claims priority, application Germany April 10, 1952

8 Claims. (Cl. 260—482)

This invention relates to esters of carbamic acid, and more particularly to esters of carbamic acid with acetylene carbinols, and to a method of making same.

It is one object of this invention to provide new esters of carbamic acid with valuable therapeutic properties and more particularly compounds exerting pronounced hypnotic effects. The new compounds have the advantage over known hypnotics that almost no side effects occur on administering the same.

Another object of this invention is to provide a simple and effective method of producing said new esters of carbamic acid.

Other objects of this invention and advantageous characteristics thereof will appear from this specification.

The new esters of carbamic acid, according to this invention, correspond to the general formula

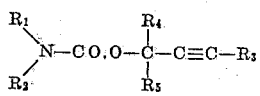

In this formula $R_1$, $R_2$, $R_3$ and $R_4$ are hydrogen or a hydrocarbon residue while $R_5$ is a hydrocarbon residue.

Compounds of this type may be produced by the one or the other of the following methods.

Carbamic acid halogenides which may be substituted in the amino group by hydrocarbon residues are reacted with secondary or tertiary carbinol compounds substituted by an alkyne residue to form the corresponding esters.

Another method of producing such compounds consists in first preparing halogeno formic acid esters of secondary or tertiary alkinyl substituted carbinols by reacting said carbinols with carbonic acid dihalogenides, such as phosgene, preferably in the presence of quinoline and the like tertiary bases. Said halogeno formic acid esters are then reacted with ammonia or primary or secondary amines to form the corresponding carbamic acid esters.

One may also react secondary or tertiary alkinyl substituted carbinols with phenyl isocyanate and other isocyanates to form the new carbamic acid ester.

It is surprising that these methods permit the production of new carbamic acid esters, inasmuch as, on account of the known reactivity of the alkinyl group, undesired side reactions, such as ring closure and others, were to be expected. Likewise halogeno formic acid esters are very reactive and sensitive compounds and quite readily decomposed. Therefore, an expert would not regard them as suitable starting materials for the preparation of such new esters.

The following examples serve to illustrate this invention. It is to be understood, of course, that the invention is not to be limited to the specific esters given in the examples nor to the precise modes of manufacture hereinafter described, as this invention, as defined in the appended claims, can be embodied in a plurality and variety of forms and can be practiced in a plurality and variety of ways.

Example 1

42 g. (0.43 mol) of 3-methyl pentyne-(1)-ol-(3) in 250 cc. of absolute ether are slowly added, while cooling with ice, to 34 g. (0.43 mol) of carbamic acid chloride. The mixture is allowed to stand over night and is washed with water. The ethereal solution is dried over anhydrous sodium sulfate and in the ether is distilled off. The residue is distilled in a vacuum and yields a colorless distillate boiling at 120–121° C./12 mm. On recrystallization from hexane, crystals are obtained which melt at 56–58° C. The reaction product forms a silver salt, can be catalytically hydrogenated to the carbamic acid ester of methyl diethyl carbinol, and, thus, represents the carbamic acid ester of 3-methyl pentyne-(1)-ol-(3) of the following formula

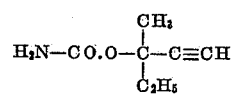

Example 2

A solution of 51 cc. (0.75 mol) of phosgene in 150 cc. of absolute ether is added, while cooling with a mixture of sodium chloride and ice, to a solution of 67 cc. (0.72 mol) of 3-methyl butyne-(1)-ol-(3) in 100 cc. of absolute ether. 96 cc. (0.75 mol) of quinoline, dissolved in 100 cc. of absolute ether, are slowly added thereto drop by drop whereby the temperature of the reaction mixture must not exceed −5° C. The mixture is allowed to stand over night at 0° C. The precipitated quinoline chlorohydrate is filtered off and the filtrate is added, while cooling with a mixture of sodium chloride and ice, to an ethereal solution of ammonia. During addition of the filtrate to the ammonia solution ammonia gas is introduced into the mixture. The reaction mixture is worked up as described in Example 12 and yields 30 g. of carbamic acid ester of 3-methyl butyne-(1)-ol-(3), boiling at 111° C./12 mm. On recrystallization from cyclohexane crystals are obtained melting at 108° C. The compound corresponds to the formula

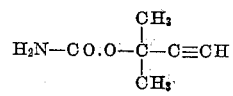

Example 3

A solution of 34 cc. (0.5 mol) of liquid phosgene in 150 cc. of absolute ether is reacted, according to Example 2, first with 62 g. (0.5 mol) of 1-ethinyl cyclohexanol-1 and 64 cc. (0.5 mol) of quinoline. The precipitated quinoline chlorohydrate is filtered off and the filtrate is reacted with ammonia in ether as described in Example 12. In this manner 45 g. of the carbamic acid ester of 1-ethinyl cyclohexanol are obtained. Yield: 53% of the theoretical yield. The ester boils at 108–110° C./3 mm. and, on recrystallization from cyclohexane, yields colorless needles melting at 94–96° C. corresponding to the formula

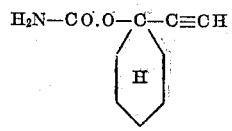

Example 4

A solution of 34 cc. (0.5 mol) of liquid phosgene in 150 cc. of absolute ether is reacted, as described in Example 2, with 49 g. (0.5 mol) of 3-methyl pentyne-(1)-ol-(3) and 64 cc. of quinoline. The precipitated quinoline chlorohydrate is filtered off and the filtrate is added drop by drop at −10° C. to a solution of 40 g. of methylamine in 100 cc. of absolute ether. In the course of several hours the temperature of said mixture is allowed to rise to room temperature. The reaction solution is then washed successively with an 0.5 N sodium hydroxide solution, with a 1 N hydrochloric acid, and with water and is dried over anhydrous sodium sulfate. On distillation in a vacuum the N-methyl carbamic acid ester of 3-methyl pentyne-(1)-ol-(3) is obtained. Yield: 45%. Boiling point: 111–112° C./14 mm. Colorless crystals, melting at 53–54° C., are obtained on recrystallization from hexane. The compound corresponds to the formula

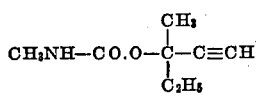

Example 5

61 g. of collidine, dissolved in 70 cc. of toluene, are added drop by drop, within 1½ hours, to a solution of 62 g. of 1-ethinyl cyclohexanol dissolved in 200 cc. of absolute toluene, and 51 g. of phosgene while stirring. Thereby the temperature is maintained between 5° C. and 10° C. by cooling with ice.

Stirring is continued for 1 to 2 hours and the reaction mixture is allowed to stand over night at about 10° C. The precipitated collidine chlorohydrate is filtered off by suction and is washed with toluene. The filtrate and the wash toluene are combined. The combined toluene solution is added to 250 cc. of toluene while ammonia gas is continuously passed through the mixture and while cooling with ice. The toluene solution is added to said ammonia-toluene mixture at such a slow rate that the temperature does not exceed 10° C. Stirring is continued for further 15 minutes and the reaction mixture is worked up as described in the preceding examples. The dried toluene solution of the carbamic acid ester is cooled to a temperature between −5° C. and 0° C. Thereby most of the ester crystallizes. After filtering off the crystals by suction, the filtrate is concentrated by evaporation and is again allowed to stand for some time whereby crystals precipitate. The concentrated solution may also be subjected to vacuum distillation. Total yield of the carbamic acid ester of 1-ethinyl cyclohexanol: 50.8 g. corresponding to 60.7% of the theoretical yield.

Example 6

6.2 g. of 1-ethinyl cyclohexanol are dissolved in 100 cc. of absolute pyridine. 5.5 cc. of phenyl isocyanate are added thereto. The mixture is boiled under reflux for 17 hours. On working up the reaction mixture by means of ether as described in Example 12 there are obtained, besides diphenyl urea, 4.2 g. of the crystalline phenyl carbamic acid ester of 1-ethinyl cyclohexanol which, on recrystallization from hexane, melts at 94–96° C. and corresponds to the formula

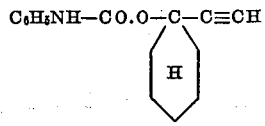

Example 7

32 g. of 1-propinyl cyclohexanol, dissolved in 150 cc. of dry ether are added drop by drop at about 0° C., while stirring, to 23 g. (0.3 mol) of carbamic acid chloride dissolved in 150 cc. of dry ether. The mixture is allowed to stand over night and is worked up by means of water. The ethereal solution is dried over potassium carbonate, filtered, concentrated by evaporation, and cooled to a temperature of about −10° C. 10 g. of colorless crystals are obtained which melt at 137–139° C. and represent the carbamic acid ester of propinyl cyclohexanol. Yield: 25% of the theoretical yield. The compound corresponds to the formula

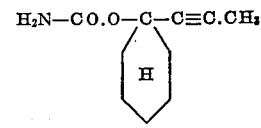

The carbamic acid ester of 1-(1²-phenyl-ethinyl)-cyclohexanol is obtained in an analogus manner by using, in the place of propinyl cyclohexanol, the equimolecular amount of (phenyl-ethinyl)-cyclohexanol. Said ester, on recrystallization from hexane, yields crystals melting at 110–111° C. It corresponds to the formula

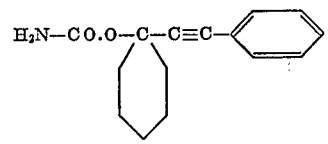

The starting material, the 1-propinyl cyclohexanol-(1), melting at 45–46° C., is produced by reacting cyclohexanone with the sodium compound of methyl acetylene in liquid ammonia according to the method of Campbel, Campbel, and Eby, "Journal of the American Chemical Society," vol. 60, page 2882 (1938).

Example 8

129 g. of quinoline dissolved in 140 cc. of absolute ether are added to a solution of 70 g. of butyne-(1)-ol-(3) and 99 g. of phosgene in 400 cc. of ether at about −10° C. within 4 hours while stirring. After allowing the mixture to stand for about 16 hours at −6° C., precipitated quinoline chlorohydrate is filtered off by suction and the ethereal solution is added drop by drop to 750 cc. of ether at −5° C. while stirring and passing ammonia gas therethrough. When the reaction is complete, the mixture is worked up as described in the preceding examples and the resulting butyne-(1)-yl-(3)-urethane is purified by distillation. It corresponds to the formula

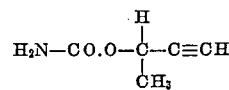

On recrystallization from hexane, crystals are obtained which melt at 48–50° C. and have a boiling point of 108–109° C./12 mm. Yield: 50 g. corresponding to 49% of the theoretical yield.

Example 9

56 cc. of 2,4,6-collidine, dissolved in 50 cc. of toluene, are slowly added at +10° C. to a solution of 50 g. of ethinyl cyclohexenyl carbinol and 40 g. of phosgene in 200 cc. of toluene while stirring. Stirring of the mixture is continued for 2 hours and the mixture is worked up as described in Example 12. On concentrating the solution by evaporation 25.8 g. of the corresponding carbamic acid ester are obtained corresponding to a yield of 40%. Recrystallization from ether is repeated twice yielding the pure ester which melts at 117–118° C. The compound corresponds to the formula

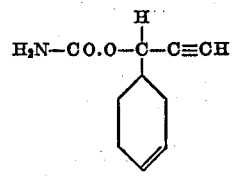

The starting material, the ethinyl cyclohexenyl carbinol (boiling point: 103–105° C./14 mm.), is obtained on reacting tetrahydrobenzaldehyde and the sodium compound of acetylene in liquid ammonia according to the method of Campbel, Campbel, and Eby, loc. cit.

Example 10

39 g. of endomethylene-cyclohexenyl ethinyl carbinol, dissolved in 100 cc. of dry ether, is added drop by drop at about 0° C. to 25 g. of carbamic acid chloride while stirring. The mixture is allowed to stand over night and is worked up with water. The ethereal solution is concentrated by evaporation and the concentrated solution is cooled to about —10° C. 28 g. of the corresponding carbamic acid ester, melting at 114–116° C., are obtained. Yield: 53% of the theoretical yield. The compound corresponds to the formula

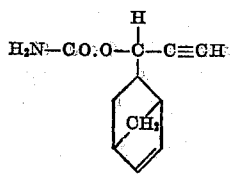

The starting material, the endomethylene-cyclohexenyl ethinyl carbinol (boiling point: 103–107° C./14 mm.), is obtained by reacting endomethylene-tetrahydrobenzaldehyde and the sodium compound of acetylene in liquid ammonia according to the method of Campbel, Campbel, and Eby, loc. cit.

Example 11

28 g. of diethyl carbamic acid chloride, 31 g. of 1-ethinyl cyclohexanol, and 31 g. of 2,4,6-collidine are dissolved in 150 cc. of toluene. The solution is boiled under reflux for 5 hours. The precipitated collidine chlorohydrate is separated. The remaining toluene solution is washed successively with dilute (10%) sulfuric acid, dilute (5%) sodium hydroxide solution, and water, dried, concentrated by evaporation, and distilled in a vacuum. The main fraction distills over at 94–96% C./2 mm. It represents the diethyl carbamic acid ester of ethinyl cyclohexanol, melting at 30–33° C. Yield: 15 g. corresponding to 27% of the theoretical yield. The compound corresponds to the formula

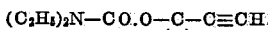
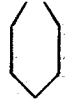

Example 12

A cooled solution of 49.6 g. (1 mol) of ethinyl cyclohexanol in 164 g. of toluene, dried over sodium metal, is mixed, while stirring, at about 0° C. with a cooled solution of 51.48 g. (1.3 mol) of phosgene in 157.6 cc. of toluene. A solution of 27.2 g. of trimethylamine (1.15 mol) in 180 cc. of toluene is added drop by drop thereto within 60 to 70 minutes while stirring and keeping the temperature at 2–4° C. Stirring is continued at about 0° C. for one half hour. The precipitated trimethylamine chlorohydrate is filtered off by suction and is washed four times, each time with so much toluene that the chlorohydrate is just covered by the solvent on thorough mixing. The salt is dried in a drying oven at 60° C. 41.45 g. of trimethylamine chlorohydrate are recovered corresponding to 94.5% of trimethylamine used. The filtrate and the wash toluene are combined and ammonia gas is introduced into said mixture at about 3° C. for about 1½ hours. After the reaction is complete the mixture is transferred into a separatory funnel, mixed with 100 cc. of water and diluted with 2,000 cc. of ether. The aqueous ammonium chloride solution is separated, the ethereal layer is successively washed with water, several times with 10% sulfuric acid, and again with water. The wash waters are combined with the ammonium chloride solution and are extracted with ether. Likewise the sulfuric acid wash waters are extracted several times with ether. The ether extracts obtained thereby are combined with the ether-toluene solution and are dried over sodium sulfate. The dried solution is evaporated first at atmospheric pressure and at the end in a vacuum. As soon as crystallization sets in, 100 cc. of benzine boiling between 50° C. and 60° C. are added and the mixture is allowed to stand at 0° C. for several hours to complete crystallization. The crystals are filtered off by suction and washed several times with benzine. They are dried at 50° C. and yield 54.45 g. of 1-ethinyl cyclohexanyl urethane melting at 93–95° C. Yield: 81.5% of the theoretical yield. Some starting material is recovered by evaporating and distilling in a vacuum the benzine mother liquors.

Recovery of the trimethylamine:

90 cc. of 50% sodium hydroxide solution are added drop by drop to 95 g. (1 mol) of trimethylamine chlorohydrate obtained in the course of the procedure described above and placed into a distilling flask. The trimethylamine generated thereby is recovered in a flask cooled to a low temperature. The reaction mixture is finally heated to about 80° C. to drive off all of the trimethylamine. In this manner about 58 g. of trimethylamine are recovered in a relatively dry state. The best method of completely drying said compound consists in diluting it with toluene and adding potassium hydroxide and barium oxide to said solution. Yield: 98–99% of the theoretical yield. The toluene solution may be used directly for further reactions.

The above given examples describe the production of carbamic acid esters wherein $R_1$ and $R_2$ are either hydrogen or hydrocarbon residues. It is, however, also possible to produce valuable compounds of the formula

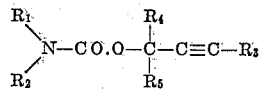

wherein $R_1$ and $R_2$, together with the nitrogen atom, form a heterocyclic ring. The following example describes the manufacture of such compounds without, however, limiting the invention thereto.

Example 13

62 g. of ethinyl cyclohexanol are converted by reaction with 51 g. of phosgene in the presence of 61 g. of collidine, as described in example 5, into the corresponding chloroformic acid ester. The toluene solution of said ester is added drop by drop at —6° C. to a solution of 100 cc. of pyrrolidine in 250 cc. of toluene in the course of 3½ hours while stirring. Stirring is continued for 2 hours and the reaction mixture is worked up as described in example 12. The N-pyrrolidino carboxylic acid ester of ethinyl cyclohexanol obtained thereby is recrystallized from hexane. Its boiling point is 122–123° C./3 mm., its melting point 62–64° C. It forms colorless crystals. Yield: 32%. The compound corresponds to the formula

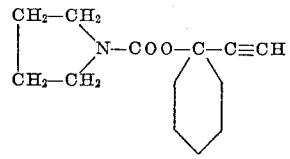

In the place of carbamic acid chloride there may be used in the preceding examples equimolecular amounts of substituted carbamic acid chlorides in which one or both hydrogen atoms of the amino group are substituted by methyl, ethyl, n-propyl, isopropyl, n-butyl, allyl, n-amyl, isoamyl, cyclohexenyl, cyclopentenyl, 1-methyl butenyl, n-hexyl, 1-methyl butyl, isobutyl, 2-bromo allyl, secondary butyl, furfuryl, benzyl, and other residues. Or one may employ piperidino, morpholino, or other carbonic acid chlorides, or other similarly constituted substituted and unsubstituted carbamic acid halogenides.

Likewise, carbonic acid dibromide may be used in the place of phosgene.

The solvents employed must be in a waterfree condition and must not react with the reaction components. In the place of diethyl ether, other ethers may be used and in the place of toluene other aliphatic, cycloaliphatic, and aromatic hydrocarbons. Other solvents such as carbon tetrachloride, chloroform, and other halogenated hydrocarbons may also be employed.

Quinoline and collidine may be replaced by other tertiary bases, such as trimethylamine, isochinoline, pyridine, acridine, and others.

In the place of ammonia and methylamine there may be used other primary and secondary bases, such as dimethylamine, ethylamine, diethylamine, propylamine, n-butylamine, di-n-butylamine, aniline, piperidine, morpholine, pyrrolidine, allylamine, cyclohexenylamine, cyclopentenylamine, 2-bromo allylamine, furfurylamine, and others.

In the place of the secondary and tertiary alkinyl carbinols mentioned in the examples there may be used as reaction components equimolecular amount of pentyne-(1)-ol-(3), hexyne-(1)-ol-(3), hexyne-(2)-ol-(4), 1-phenyl-butyne-(1)-ol-(3), and others. Especially suitable starting materials are the reaction products of ketones with alkali compounds of alkynes, such as the 1-ethinyl cyclohexanol-1 used in Examples 3, 5, and 6 as reaction components. Other reaction products of this type, such as ethinyl menthol, ethinyl cyclopentanol, ethinyl cycloheptanol, may be used likewise in this reaction.

The most effective hypnotic agents of this new class of carbamic acid esters of secondary and tertiary carbinols having the least side effects are The carbamic acid ester of 1-ethinyl cyclohexanol
The carbamic acid ester of 3-methyl-pentyne-(1)-ol-(3)
The carbamic acid ester of 3-methyl-butyne-(1)-ol-(3)

The carbamic acid ester of 1-ethinyl cyclohexanol, for instance, produces, within about 30 minutes, sleep of a duration of about 6 hours, when administered in a single dose of 400 to 500 mg. Other compounds produce similar effects.

Of course, many changes and variations in the substituents $R_1$, $R_2$, $R_3$, $R_4$, and $R_5$ of the new carbamic acid esters, in the conditions of their manufacture, the temperatures employed, the solvents and catalysts used, the methods of working up and purifying the reaction products, and the like may be made by those skilled in the art in accordance with the principles set forth herein and in the claims annexed hereto.

We claim:
1. A carbamic acid ester of the formula

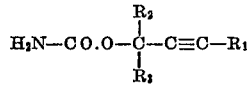

wherein $R_1$ indicates a member selected from the group consisting of hydrogen, methyl, and phenyl, $R_2$ is a member selected from the group consisting of hydrogen and methyl and $R_3$ is a member selected from the group consisting of methyl, ethyl, cyclohexenyl, endomethylene cyclohexenyl, and, together with $R_2$, pentamethylene.

2. A carbamic acid ester of the formula

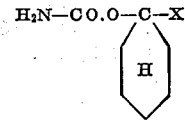

wherein X is a lower 1-alkinyl radical.

3. The carbamic acid ester of 1-ethinyl cyclohexanol-1 melting at 94–96° C. on recrystallization from cyclohexane.

4. The carbamic acid ester of 1-propinyl cyclohexanol-1 melting at 137–139° C.

5. The carbamic acid ester of ethinyl cyclohexenyl carbinol melting at 117–118° C. on recrystallization from ether.

6. Carbamic acid esters of the formula

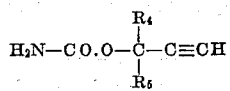

wherein $R_4$ is methyl and $R_5$ is a lower alkyl radical.

7. The carbamic acid ester of 3-methyl pentyne-(1)-ol-(3) melting at about 56–58° C. on recrystallization from hexane.

8. Carbamic acid esters of the formula

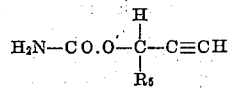

wherein $R_5$ is a lower alkyl radical.

References Cited in the file of this patent

UNITED STATES PATENTS

| | | |
|---|---|---|
| 675,539 | Bonhoeffer | June 4, 1901 |
| 2,536,079 | Papa | Jan. 2, 1951 |
| 2,541,646 | Gleim | Feb. 13, 1951 |
| 2,609,386 | Lott | Sept. 2, 1952 |

OTHER REFERENCES

Johnson, Acetylenic Compounds, Arnold, 1946, vol. 1, pp. 38, 275–333.

Young et al., J. A. C. S. 73, 780–2 (1951).